United States Patent [19]
Hankinson et al.

[11] Patent Number: 5,703,660
[45] Date of Patent: Dec. 30, 1997

[54] SYSTEM AND METHOD FOR DECODING A QUADRATURE AMPLITURE MODULATED SIGNAL

[75] Inventors: Robert J. Hankinson, Carrollton, Tex.; Otto Sponring, San Jose, Calif.

[73] Assignee: Cirrus Logic, Inc., Fremont, Calif.

[21] Appl. No.: 598,453

[22] Filed: Feb. 8, 1996

[51] Int. Cl.$^6$ ........................................ H04N 5/65
[52] U.S. Cl. ........................... 348/638; 348/727; 348/507; 348/639
[58] Field of Search .................... 348/641, 638, 348/639, 640, 645, 649, 727, 507; H04N 5/65, 9/66

[56] References Cited

U.S. PATENT DOCUMENTS

| | | | |
|---|---|---|---|
| 3,597,540 | 8/1971 | MacIntyre, Jr. | 178/9.3 R |
| 4,533,938 | 8/1985 | Hurst | 348/638 |
| 5,317,410 | 5/1994 | Monta et al. | 348/638 |
| 5,351,089 | 9/1994 | Matsumoto et al. | 348/638 |
| 5,459,524 | 10/1995 | Cooper | 348/639 |
| 5,512,947 | 4/1996 | Sawachi et al. | 348/243 |

*Primary Examiner*—Glenton B. Burgess
*Attorney, Agent, or Firm*—Fulbright & Jaworski; Steven A. Shaw

[57] ABSTRACT

A video signal decoder using a sample clock tied to a frequency that is an integer multiple of four times the color subcarrier (4*Fsc). By using a 4*Fsc rate on a given input wave, the decoder determines the phase shift between the sample clock and the original wave being sampled. Then, the decoder calculates the color based upon that shift. Circuitry for implementing the decoder contains two major circuit paths. The decoding process consists of two main phases and each path performs a different function during each phase. During the first phase, the first path calculates constants based upon a user's hue and saturation adjustments used for chroma demodulation. Also during the first phase, the second path examines the color burst signal and from that signal finds the black level of the incoming video signal. During the second phase, the first path decodes the color in the TV signal using the constants calculated during the first phase. Also during the second phase, the second path pulls the luma information out of the signal line.

39 Claims, 4 Drawing Sheets

| SeqCt | RomAd | RomDa | MultA | MultB | MultO | MltFF | AccmA | AccmB | AccmO | AccFF | SinTm | CosTm |
|---|---|---|---|---|---|---|---|---|---|---|---|---|
| 1 | cos | | | | | | | | | | | |
| 2 | sin | hu | hu | sat | shu | | | | | | | |
| 3 | | hv | hv | sat | shv | shu | | | | | | |
| 4 | | | shu | s0 | sa | shv | | | | | | shu |
| 5 | | | shv | s1 | sb | sa | 0 | −sa | −sa | | shv | |
| 6 | | | shu | s1 | ca | sb | −sa | −sb | st | −sa | | |
| 7 | | | shv | s0 | cb | ca | 0 | ca | ca | st | | |
| 8 | | | | | cb | ca | ca | −cb | ct | ca | st | |
| 9 | | | | | | | | | | ct | | ct |

FIG. 7

| SeqCt | Mul | Mul | Mul | Mlt | Acc | Acc | Acc | Acc | U | V |
|---|---|---|---|---|---|---|---|---|---|---|
| 1 | st | b0A | ubA | | | | | | | |
| 2 | ct | b1A | uaA | ubA | 0 | $\overline{ubA}$ | $\overline{ubA}$ | | | |
| 3 | st | b1a | vbA | uaA | $\overline{ubA}$ | uaA | uA | $\overline{ubA}$ | | |
| 4 | ct | b0A | vaA | vbA | 0 | vbA | vbA | uA | | |
| 1 | st | b0B | ubB | vaA | vbA | vaA | va | vbA | uA | |
| 2 | ct | b1B | uaB | ubB | 0 | $\overline{ubB}$ | $\overline{ubB}$ | vAb | | |
| 3 | st | b1B | vbB | uaB | $\overline{ubB}$ | uaB | ub | $\overline{UbB}$ | | vA |
| 4 | ct | b0B | vaB | vbB | 0 | vbB | vbB | uB | | |
| 1 | st | b0C | ubC | vaB | vbB | vaB | vb | vbB | uB | |
| 2 | ct | b1C | uaC | ubC | 0 | $\overline{ubC}$ | $\overline{ubC}$ | vb | | |
| 3 | st | b1C | vbC | uaC | $\overline{ubC}$ | uaC | uC | $\overline{ubC}$ | | vB |
| 4 | ct | b0C | vaC | vbC | 0 | vbC | vbC | uC | | |
| 1 | st | b0D | ubD | vaC | vbC | vaC | vC | vbC | uC | |
| 2 | ct | b1D | uaD | ubD | 0 | $\overline{ubD}$ | $\overline{ubD}$ | vc | | |
| 3 | st | b1D | vbD | uaD | $\overline{ubD}$ | uaD | uD | $\overline{ubD}$ | | vC |
| 4 | ct | b0D | vaD | vbD | 0 | vbD | vbD | uD | | |

*FIG. 8*

SYSTEM AND METHOD FOR DECODING A QUADRATURE AMPLITURE MODULATED SIGNAL

RELATED APPLICATION

This application is related to Ser. No. 08/578,300, entitled SYSTEM AND METHOD FOR EXTRACTING CAPTION/TELETEXT INFORMATION FROM A VIDEO SIGNAL, filed Dec. 22, 1995, and hereby incorporated by reference herein. These applications are commonly assigned.

TECHNICAL FIELD OF THE INVENTION

This invention relates to a method and system for decoding a quadrature modulated signal using a measured phase shift technique and signal samples, and specifically to using the method and system in a TV video decoder for decoding video signals in the NTSC and PAL signal standards.

BACKGROUND OF THE INVENTION

A quadrature modulated amplitude (QAM) signal has a single frequency carrier split into two separate carriers by using a 90 degree phase shift network. Thus, QAM provides two independent carriers of the same frequency which can both be modulated. For example, a television (TV) signal uses QAM to carry the two chroma (C) components of a picture.

In order to decode a color TV signal, TV decoders have an A/D YC separator. Once Y and C are separated, the C data is processed for chroma demodulation and then various brightness, contrasts, and saturation adjustments are made to the data. To time all of this processing there is usually some circuitry having a PLL for locking and synchronizing the sample clock with the incoming stream.

Synchronizing with a random sample clock is computationally intensive. Accordingly, hardware for TV decoding in a personal computer (PC) environment is expensive.

Therefore, there is a need in the art for a way to demodulate a QAM signal that does not require synchronization with a random sample clock.

More specifically, there is a need for a way to reduce the steps and calculations involved in processing an incoming NTSC and/or PAL composite sync TV signal.

There is a further need in the art for a digital decoder that can be used in the computing environment using progressively smaller (0.5 micron and below) semiconductor technology.

There is a further need in the art to save costs by using fully digital video signal processing.

SUMMARY OF THE INVENTION

The above needs are met by a decoder that decodes a quadrature amplitude modulated signal by using a sample clock tied to a frequency at an integer multiple of four times the subcarrier (4*Fsc) frequency. By using a multiple of the 4*Fsc rate on a given input wave, the decoder determines the phase shift between the sample clock and the original wave being sampled. Then, the decoder demodulates the signal based upon that shift.

A preferred embodiment of the present invention is used to implement a television (TV) signal decoder. Circuitry for implementing the decoder contains two major circuit paths. The decoding process consists of two main phases and each path performs a different function during each phase. During the first phase, the first path calculates constants based upon a user's hue and saturation adjustments used for chroma demodulation. Also during the first phase, the second path examines the color burst signal and from that signal finds the black level of the incoming video signal. During the second phase, the first path decodes the color in the TV signal using the constants calculated during the first phase. Also during the second phase, the second path pulls the luma information out of the signal line.

A technical advantage of the present invention is that it greatly simplifies the process of decoding a TV signal. Rather than alter the incoming signal through filtering and other means, the present invention merely samples the signal. The phase shift is calculated from the burst signal and used to calculate the chroma data and simple averaging is used to calculate the luma data.

Another technical advantage of the present invention is reduced hardware costs. Since a PLL is not necessary for synchronization to eliminate the phase shift, the algorithm described above can be performed by fully digital hardware, except for one or more A/D converters. Moreover, the necessary calculations can be implemented using shifters. Therefore, the present invention can be implemented in a minimal amount of silicon.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The present invention is a novel way to demodulate a quadrature amplitude modulated (QAM) signal. As mentioned above, a QAM signal has a single frequency carrier split into two separate carriers by using a 90 degree phase shift network. Thus, QAM provides two independent carriers of the same frequency which can both be modulated.

A standard television (TV) signal is comprised of a luma component and a chroma component. The chroma component, in turn, is comprised of two other components called U and V. A TV signal uses QAM to modulate the chroma components on a color subcarrier of the signal. Accordingly, a preferred embodiment of the present invention discussed below is a TV tuner for demodulating a TV signal. The present invention, however, can be used in any application where demodulation of a QAM signal is required.

Figure 1:
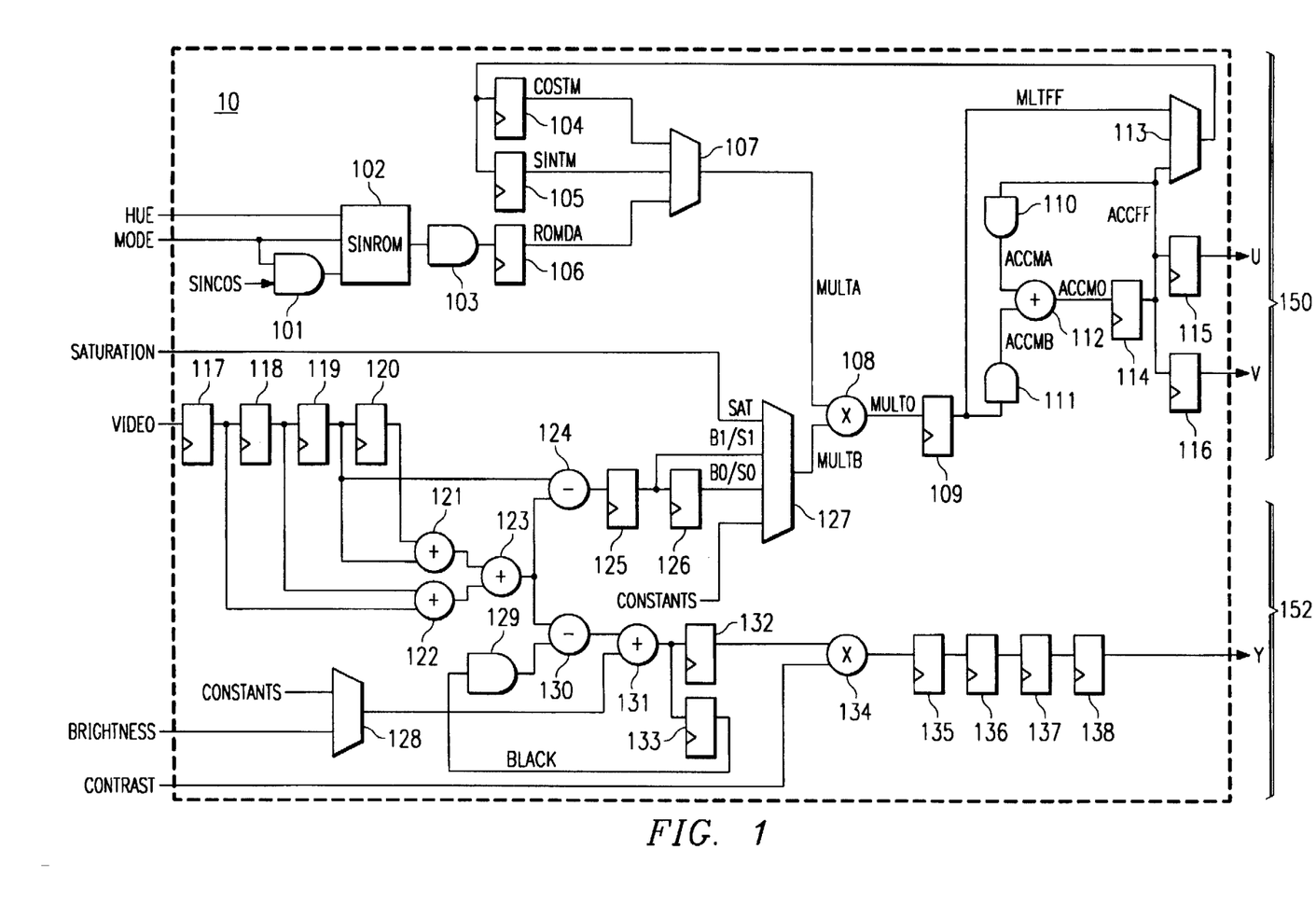
FIG. 1 is a high-level block diagram of a video decoder.

FIG. 1 is a high-level block diagram of a video decoder according to the present invention. Circuit 10 has two main parts, 150, 152. The first part, 150 includes sine/cosine address generation logic 101, sine/cosine ROM 102, sine/cosine complement lug logic 103, ROM data register 106, sine register 105, cosine register 104, the multiplier A input multiplexer 107, the multiplier 108, the multiplier B input multiplexer 127, delay registers 125 and 126, subtractor 124, an averager comprised of registers 117, 118, 119, and 120 and adders 121, 122, and 123. Also, within the first part of circuit 10 is multiplier product register 109, accumulator input combinational logic for the A 110 and B 111 inputs, accumulator 112, sum register 114, and feedback multiplexer 113.

The second main part 152 of circuit 10 consists of adders 121, 122, and 123, subtracter 130, combinational logic 129, constant multiplexer which selects predefined constants 128, adder 131, call delay register 132, feedback register 133, adder 134, and delay registers 135, 136, 137, and 138. Note that the three adders 121, 122, and 123 are actually shared with the first part, 150 of circuit 10.

Both sections 150, 152, of circuit 10 each have two main functions, depending on the stage of the decoding. The first function of the first part of circuit 10 occurs during color burst time. During color burst time, its function is to take a user's hue and saturation adjustments into account and do a precalculation and figure out two constants that are going to be used later on when the decoder actually performs the chroma demodulation. During the active part of the line, the first part 150 of circuit 10 has the job of actually decoding the color using the constants that it calculated earlier. Thus, the first part of circuit 10 has two functions. During color burst it is used to precalculate two constants by using the saturation and hue values, and during the active part of the line it actually does the chroma demodulation, that is it pulls the color out of the signal. The color comes out of the U and V registers 115 and 116.

The second part 152 of circuit 10 also has two functions. During color burst time, the first job of the second part 152 of circuit 10 is to examine the color burst signal and from that find the black level of the incoming video signal. During the active part of the line, its 152 second job is to pull the Luma information out of that line. The second part 152 of circuit 10 pulls the brightness part of the video signal and outputs that signal Y out of delay register 138.

Before continuing further with a detailed description of FIG. 1 it may be helpful to explain how the Luma and chroma components of the video signal are carried on the TV signal itself.

The incoming composite video signal may be described as:

$$Video = Luma + Chroma + Constant$$

where $$Chroma = U^* \sin(Fsc) + V^* \cos(Fsc)$$

The luma component of the composite signal may be thought of as the "dc" component, while the chroma may be thought of as the "ac" component, since it is a phase and amplitude modulated sine wave of frequency Fsc. The constant represents the part of the video signal between the sync tip and black.

Separation of the luma and chroma components is based on the following two assumptions:

The incoming video is sampled at a rate exactly four times or an integer multiple thereof of the color subcarrier.

The amplitude of the incoming video does not vary significantly within the span of the four samples.

If the incoming signal is of a constant amplitude and frequency, and is sampled at an integer multiple of four times that frequency, then the average value of the signal can be obtained in its simplest implementation as a simple average over any four samples. This average value is the instantaneous value for the luma component of the incoming signal. The chroma component can then be found by subtracting this calculated lurea component from the input signal.

Figure 2A:
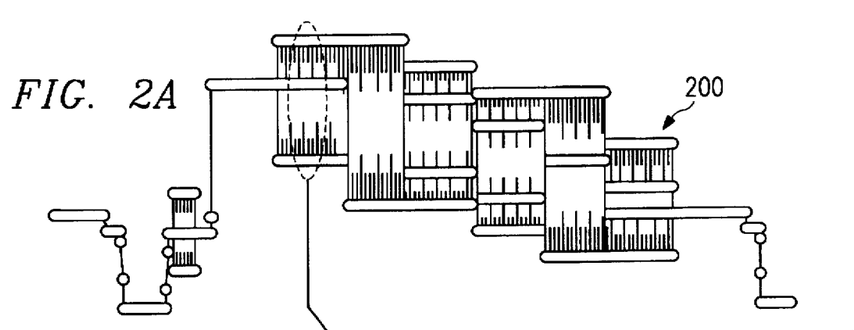
FIG. 2A shows a colorbar signal.
Figure 2B:
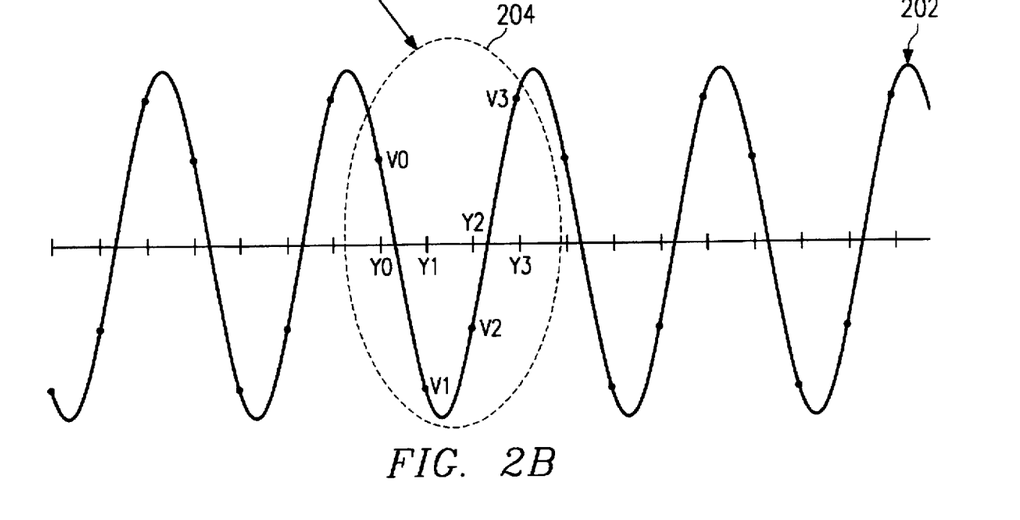
FIG. 2B shows a magnification of a section of the colorbar signal.

FIG. 2A and 2B show this sampling by magnifying a section of colorbar signal 200. Notice that the sampling (shown on the sine wave 202 as dots V0-V3) does not happen at any "special" phase of the signal; it just occurs at exactly four times the frequency of the color subcarrier.

Circle 204 surrounds four consecutive samples V0-V3. It can easily be seen that because of the 4x sampling rate, the average of these samples is the center of wave 202.

Consider the four consecutive samples in the circle, V0, V1, V2, V3. Notice that any one of average values Y0, Y1, Y2 or Y3 could have been calculated using these four samples. In a preferred embodiment of the present invention, Y1 is calculated from these four samples as:

$$Y1 = (V0 + V1 + V2 + V3)/4.$$

More generally, a preferred embodiment extracts luma from the signal for each input sample as:

$$Yn = (V(n-1) + Vn + V(n+1) + V(n+2))/4.$$

Afterwards, the chroma is simply what remains of the video signal once the luma is removed for each sample. In general terms:

$$Cn = Vn - Yn.$$

Once the Y and C components have been separated, they are now processed separately by the two paths 150, 152 of circuit 10. The Y component is processed for contrast and brightness adjustment, while the C component is processed by the chroma demodulator for extraction of the U and V values.

Chroma Demodulator

The chroma demodulator 150 works quite differently than the demodulator of a prior art television. One of the major requirements of the demodulator 150 according to the present invention is that the incoming video be sampled at a frequency of precisely four times the color subcarrier.

Once the luma component of the video has been removed, the remaining chroma component is essentially a sine wave. Of course, the amplitude and relative phase of the chroma component are constantly changing as a function of the instantaneous saturation and hue of the image, but given the limited bandwidth of the color components (as compared to the bandwidth of the luma component), the signal really is not changing all that much from cycle to cycle. In other words, from cycle to cycle, the change in amplitude and phase is so small that it is acceptable to treat the chroma component as a pure sine wave.

From this assumption it is possible to extract quite a bit of information from the signal. To understand this, extraction, assume that the incoming signal is of a constant color. A constant color means the video signal is really a pure sine wave at the frequency of the color subcarrier (about 3.58 MHz for NTSC, about 4.43 MHz for PAL) with some amplitude (the saturation), and with some relative phase to the color subcarrier reference (the hue).

Figure 3:
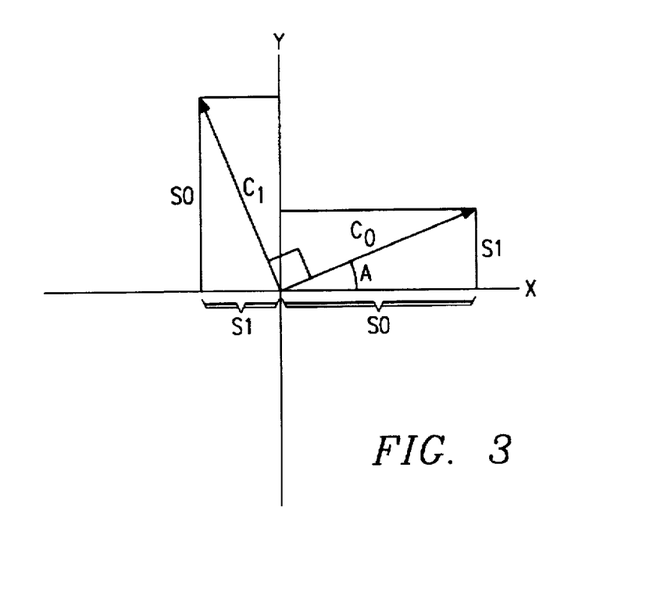
FIG. 3 shows a sine wave projected onto a phasor.

Recall that a sine wave can be represented as a projection onto the real axis of a phasor, rotating counter-clockwise, on a complex plane. Consider FIG. 3. Lines $C_0$ and $C_1$ represent two consecutive samples of a sine wave that is being sampled at four times its frequency (i.e., the samples are separated by 90 degrees). In FIG. 3, the real axis is labelled as "X", and the imaginary axis is labelled as "Y". Let $C_0$ represent the position of the phasor at some arbitrary time T0, while $C_1$ represents the same phasor a quarter of a cycle later (where it's rotated counter-clockwise by exactly 90 degrees); call it T1.

On the X (real) axis, note that line S0 represents the value of the sample generated by the A/D converter at some arbitrary time T0. Line S1 represents the value of the very next sample, a quarter of a cycle later (90 degrees later) at time T1.

Since FIG. 3 is a sine wave, the saturation of the signal (which is the amplitude of the sine wave and represented as the length of lines $C_0$ and $C_1$) is constant. Given this, simple trigonometry shows that, the imaginary (Y) part of the second sample has the same value as the real (X) part of the first sample, S0. Same thing with S1—the imaginary part of the first sample is exactly the same as the real part of the second sample.

The important ramification of this is that when 2 consecutive samples of a signal are obtained at times T0 and T1, both the real and imaginary components of the signal as it exists at time T0 are present.

With the above components, all sorts of information about the signal at time T0 can be deduced. For example, the amplitude of the signal (the saturation) at time T0 (call it Vsat) can be calculated with help from Pythagoras as:

$$Vsat = sqrt((S0)^2 + (S1)^2)$$

Notice also the angle labeled as "A". Angle "A" can be calculated as:

$$A = atan(S1/S0)$$

Color (hue) is contained in a video signal as the phase of the signal with respect to the color subcarrier reference. While angle "A" can be calculated using the above equation, remember that this angle is only the "hue" of the signal with respect to the "X" axis, which has no phase relationship to the subcarrier reference. In other words, this information does not help to decode the color information.

The above point is important. The X and Y axes in FIG. 3 can be thought of as the "sampling" axes. In a preferred embodiment there is no phase relationship between the signal's subcarrier reference and the sampling clock. The sampling clock is generated right off the chip's crystal (not shown), without regard to the phase of any other reference.

Figure 4:
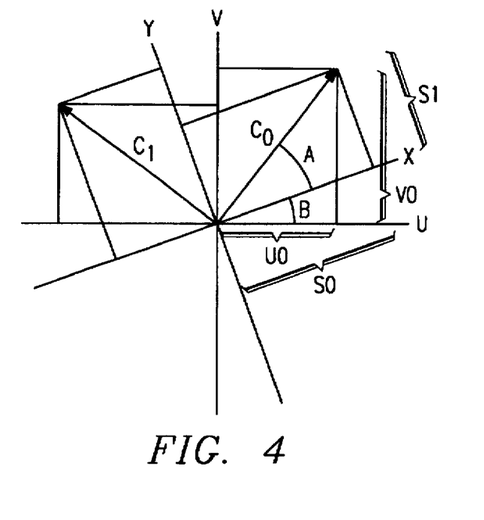
FIG. 4 shows a rotation of FIG. 3.

Consider FIG. 4. FIG. 4 shows FIG. 3 redrawn with the X/Y axes rotated. FIG. 4 shows that the X/Y axes have no relationship with U/V, and are shown rotated by some arbitrary angle "B".

FIG. 4 shows two consecutive samples of the signal, $C_0$ and $C_1$. The values S0 and S1 represent the real (X) and imaginary (Y) components of the signal. The problem is that there is no way to convert these X and Y values to something more meaningful, like U and V. S0 and S1 represent the projections of the color vector onto the X and Y axes, but, in order to decode the color, the projection of that vector onto the U and V axes must be found. The U and V values, labelled as U0 and V0, if they could be obtained, would provide the actual color of the signal.

The problem is that these two samples just don't provide enough information to express the S0 and S1 values in terms of U and V. Fortunately, there is one other source of information. Of course, that other source is the colorburst, provided for a short interval at the beginning of each active line.

The purpose of the colorburst in a normal TV is to keep the TV's colorburst oscillator buzzing in phase with the colorburst itself, which in turn gives the TV a "clue", or indication of the phase of the subcarrier reference in the transmitter. In NTSC, the subcarrier reference is defined as being 180 degrees away from the colorburst, and is also defined as being along the direction of the positive U axis. The colorburst, then, provides the information necessary to "find" the +U axis. It's just 180 degrees away.

In PAL, things are just a bit trickier—the definition of the subcarrier reference changes from line to line with respect to the colorburst, but is always defined as lying on the +U axis. On alternate lines, the subcarrier reference (the +U axis) is 135 degrees ahead of the colorburst, and on the other lines, the reference is 135 degrees behind the colorburst. To keep things simple, the below discussion will first address the NTSC case.

Figure 5:
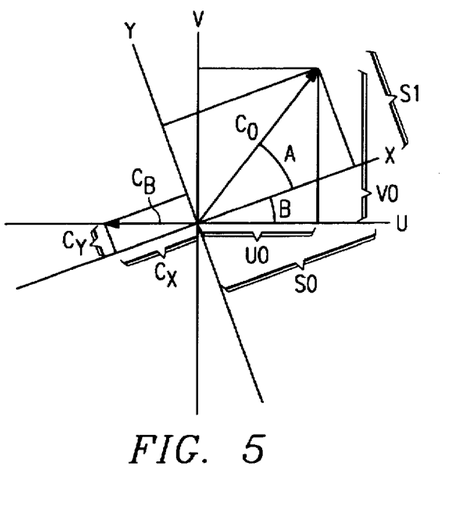
FIG. 5 shows FIG. 4 with the addition of a colorburst vector.

Consider FIG. 5. As before, $C_0$ represents the position of the video phasor at the time of the first sample. The values of the two samples are shown as S0 and S1. Superimposed on the graph, however, is vector pointing out along the -U axis, labeled as $C_B$. This represents the colorburst, which is a constant amplitude sine wave 180 degrees from the reference sub carrier axis U.

The key here is that while the sampling clock (and therefore the rotation of the X/Y axes relative to U/V) is not phase related to the +U reference, it is consistent in phase throughout the line. If, during the colorburst interval, two consecutive samples of the colorburst (shown as $C_x$ and $C_y$) are obtained, there is now enough information to extract the color components of the line.

Sampling the colorburst works just like sampling the active video, where two consecutive samples gives a projection of the colorburst vector onto the real (X) and imaginary (Y) axes.

Obtaining two samples of colorburst gives enough information to calculate the angle "B", since the colorburst must point in the -U direction. The calculation of the angle "B" is:

$$B = atan(Cy/Cx)$$

The magnitude, or amplitude of the colorburst (call it Bsat) can also be determined during the colorburst interval as:

$$Bsat = sqrt((Cx)^2 + (Cy)^2)$$

Armed with this information, (the Cx and Cy values obtained during the colorburst), calculating the V0 and U0 values during the active part of the line can then proceed as follows:

$$U0 = Vsat * \cos(A+B)$$

and $$V0 = Vsat * \sin(A+B)$$

Notice that fie result of these equations is the projection of $C_0$ onto the U and V axes, and is therefore the "answer".

"Vsat", the instantaneous saturation (magnitude) of the video signal, as shown earlier, is:

$$Vsat = sqrt((X0)^2 + (Y0)^2)$$

where X0 and Y0 are the sampled values S0 and S1.

U0 and V0 are the U and V color components of the video signal at time T0. This could be generalized to allow calculation of Un and Vn at any time Tn across the active line.

Finding U0 and V0 in the above manner would be very computationally intensive. Fortunately, the above calculations can be simplified significantly by using the following trigonometric identities:

$$\sin(A+B) = \sin(A) * \cos(B) + \cos(A) * \sin(B)$$

and $$\cos(A+B) = \cos(A) * \cos(B) - \sin(A) * \sin(B)$$

Given the above, the U0 and V0 equations can be rewritten as:

$$\begin{aligned} U0 &= Vsat * \cos(A+B) \\ &= Vsat * (\cos(A)*\cos(B) - \sin(A)*\sin(B)) \\ &= (Vsat * \cos(A) * \cos(B)) - (Vsat * \sin(A) * \sin(B)), \end{aligned}$$

and $$\begin{aligned} V0 &= Vsat * \sin(A+B) \\ &= Vsat * (\sin(A)*\cos(B) + \cos(A)*\sin(B)) \\ &= (Vsat * \sin(A) * \cos(B)) + (Vsat * \cos(A) * \sin(B)). \end{aligned}$$

Now, FIG. 5 shows that:
$$S0 = Vsat * \cos(A)$$
and
$$S1 = Vsat * \sin(A).$$

Also notice that these values substitute into the U0 and V0 equations so that they can be written as:

$$\begin{aligned} U0 &= (Vsat * \cos(A) * \cos(B)) - (Vsat * \sin(A) * \sin(B)) \\ &= (S0 * \cos(B)) - (S1 * \sin(B)) \end{aligned}$$

and $$\begin{aligned} V0 &= (Vsat * \sin(A) * \cos(B)) + (Vsat * \cos(A) * \sin(B)) \\ &= (S1 * \cos(B)) + (S0 * \sin(B)) \end{aligned}$$

The two samples of the colorburst taken at the beginning of the line are known to be:

$$Cx = Bsat * \sin(B)$$
and
$$Cy = Bsat * \cos(B)$$
or,
$$\sin(B) = Cx/Bsat$$
and
$$\cos(B) = Cy/Bsat.$$

These, too, substitute into the above equations for U0 and V0:

$$\begin{aligned} U0 &= (S0 * \cos(B)) - (S1 * \sin(B)) \\ &= (S0 * Cy/Bsat) - (S1 * Cx/Bsat) \\ &= ((S0 * Cy) - (S1 * Cx))/Bsat \end{aligned}$$

and $$\begin{aligned} V0 &= (S1 * \cos(B)) + (S0 * \sin(B)) \\ &= (S1 * Cy/Bsat) + (S0 * Cx/Bsat) \\ &= ((S1 * Cy) + (S0 * Cx))/Bsat \end{aligned}$$

This can be written more generally as:
$$U(n) = ((S(n) * Cy) - (S(n+1) * Cx))/Bsat$$
and
$$V(n) = ((S(n+1) * Cy) + (S(n) * Cx))/Bsat$$

where S(n) and S(n+1) represent the "current" and "next" samples of the chroma signal, and Cx and Cy represent the first and second samples taken of the colorburst. "Bsat" is the saturation, or amplitude, of the colorburst itself.

As can be seen, these equations each require two multiplies, and either an add or subtract, followed by a divide operation to calculate both the U and V values of the signal. These equations can be simplified even more by considering that the present invention is used within a gain controlled environment, and that the amplitude of the colorburst (Bsat) is a constant and has a specified NTSC or PAL value. It turns out that this value is around 30 for both NTSC and PAL. The result is that we will be dividing by a constant having a value of about 30.

Given the high cost of doing a divide operation in hardware, and given that the result of dividing by slightly incorrect value will affect both the U and V components identically (affecting only the saturation of the image), and given that the design also has a built in saturation adjustment, it is possible to divide by 32 without serious signal degradation.

Thus, to calculate each U and V value, only two multiplies followed by an add or subtract operation are required.

Accordingly, the equations become:

$$U(n) = ((S(n)*Cy) - (S(n+1)*Cx)) >> 5$$

and $$V(n) = ((S(n+1)*Cy) + (S(n)*Cx)) >> 5$$

Finally, it is possible to take advantage of the limited bandwidth of the U and V components of the signal. Recall earlier that this whole algorithm relies on the assumption that the amplitude of the chroma does not change noticeably from sample to sample. Therefore, it is not necessary to build four multiplier circuits to calculate U and V for each sample taken.

In the preferred embodiment, there is only a single multiplier in the chroma demodulator 150, labeled "A" 108 in FIG. 1. Multiplier 108 is time-shared to perform all four of the multiplies required (2 for U, 2 for V). Also, there is only a single adder/subtractor element 112 that is used for calculating both U and V. This means that for every four samples of video received by the demodulator, only a single U/V pair is generated.

Once the luma and chroma components of the video signal have been separated, the approach of the output image may be adjusted in ways designed to mimic the adjustments of a standard television. Two of these adjustments, Brightness and Contrast, operate on the luma component of the signal. The other two adjustments, saturation and hue, operate on the chroma component.

Brightness and Contrast

After the luma component has been separated from the input video stream, the Brightness and Contrast adjustments are used to modify the separated luma component. The first adjustment to the luma component is brightness, and is implemented simply as an additional function. The contents of a BRITE register (not shown) set through user input are added to the separated luma.

BrtLuma=Luma+Brightness (FIG. 1, 131)

Once the brightness adjustment is performed, the contrast adjustment is done by multiplying a CNTRST register (not shown) by the brightness-adjusted luma.

CntLuma=BrtLuma*CntLuma (FIG. 1, 134)

The 'CntLuma' variable in the above equation represents the actual value that is output from the demodulator.

Hue and Saturation Adjustments

Adjustments to the Chroma component of the video signal are a bit more involved than the luma adjustments. The following discussion explains the theory behind the implementation of the Hue and Saturation adjustments.

It was shown in the description of the chroma demodulator 150 that the U and V values of the chroma component of the incoming video signal could be calculated using the following equations:

$$U(n)=((S(n)*Cy)-(S(n+1)*Cx))>>5$$

and $$V(n)=((S(n+1)*Cy)+(S(n)*Cx))>>5$$

In these equations, S(n) and S(n+1) represent two consecutive outputs from the ADC, which is sampling the video input at a frequency of exactly four times the color subcarrier (Fsc). Cx and Cy represent two consecutive samples from the ADC taken during the colorburst.

In practice, it is desired that the user be provided with a mechanism to adjust both the hue (tint) and saturation (color intensity) of the video signal in a manner similar to adjusting a television. As shown below, these functions can be provided without extra circuitry.

Saturation Adjustment

Adjusting the color intensity or saturation of the image is simply a matter of adjusting the magnitude (amplitude) of the chroma component of the signal. For any U and V pair being decoded, this magnitude could be expressed as:

$$Vsat=sqrt(U^2+V^2)$$

An adjustment to this magnitude means simply multiplying it by some adjustment value; call it Sat:

$$Asat=Sat*Vsat$$

where 'Asat' is the adjusted value. Note that this could be re-written as:

$$\begin{aligned} Asat &= Sat * Vsat \\ &= Sat * sqrt(U^2+V^2) \\ &= sqrt((Sat*U^2)+(Sat*V^2)) \end{aligned}$$

The point here is to show that a saturation adjustment affects both the U and V components of the signal in the same manner—both are multiplied by the saturation adjuster 'Sat'. One technique is to simply calculate the U and V values, then perform the saturation adjustment on the two components:

$$Usadj=U*Sat$$

and $$Vsadj=V*Sat$$

where Usadj and Vsadj are the saturation adjusted U and V values.

The problem with the above technique is that while the saturation adjustment is easy to do, it requires another multiply operation on both the U and V components. Rather than performing a separate multiply on the decoded U and V values, it is preferable to roll the adjustment right into the decode of the U and V values. Consider the equations used to decode U and V:

$$U(n)=((S(n)*Cy)-(S(n+1)*Cx))>>5$$

and $$V(n)=((S(n+1)*Cy)+(S(n)*Cx))>>5$$

A saturation adjustment can be factored in like so:

$$\begin{aligned} Usadj(n) &= Sat * U(n) \\ &= (Sat*((S(n)*Cy)-(S(n+1)*Cx))>>5 \\ &= ((Sat*Cy*S(n))-(Sat*Cx*S(n+1)))>>5. \end{aligned}$$

and $$\begin{aligned} Vsadj(n) &= Sat * V(n) \\ &= Sat*((S(n+1)*Cy)+(S(n)*Cx))>>5 \\ &= ((Sat*Cy*S(n+1))+(Sat*Cx*S(n)))>>5. \end{aligned}$$

Recall, also, that Cx and Cy are obtained during the colorburst interval, before the active part of each line actually begins. If the saturation adjustment is limited such that it is done on a line by line basis (rather than on a pixel by pixel basis), the Cx and Cy values can be adjusted by the saturation adjustment value before the active part of the line ever begins. Therefore, $$SCx = Sat * Cx$$

and $$SCy = Sat * Cy$$

can be calculated right after the Cx and Cy samples of the colorburst are obtained. The calculations for U and V now become:

$$\begin{aligned} Usadj(n) &= ((Sat * Cy * S(n)) - (Sat * Cx * S(n+1))) \gg 5 \\ &= ((SCy * S(n)) - (SCx * S(n+1))) \gg 5 \end{aligned}$$

and $$\begin{aligned} Vsadj(n) &= ((Sat * Cy * S(n+1)) + (Sat * Cx * S(n))) \gg 5 \\ &= ((SCy * S(n+1)) + (SCx * S(n))) \gg 5. \end{aligned}$$

Note that with the SCx and SCy values pre-calculated just after the Cx and Cy colorburst samples are obtained, the decode of U and V requires no more operations than without a saturation adjustment. Furthermore, the two multiply operations required to produce SCx and SCy can use the same multiplier in the demodulator, since these calculations are performed between the time the colorburst occurs and the time when the active part of the line actually begins.

Hue Adjustment

The present invention uses the same philosophy for hue adjustment as it does with the saturation adjustment. If the adjustment value is only considered once per line, a lot of pre-calculations can be performed between the colorburst interval and the beginning of active video, thereby eliminating the need for any extra hardware to do the adjustment.

Consider what the hue adjustment really means. Adjusting the hue is simply a matter of rotating the input chroma vector from its original point. This adjustment is true because changing its angle would change its angle relative to the subcarrier reference, which will in turn alter its hue. Of course, this would mean altering each sample of chroma during the course of the active line. It turns out that there is a simpler way to do this.

Consider the following equations that were developed in the discussion of the chroma demodulator:

$$U0 = Vsat * \cos(A+B)$$

and $$V0 = Vsat * \sin(A+B)$$

In these equations, Vsat is the magnitude of the chroma at a sample time T0, angle 'A' is the 'hue' (angle) of the chroma vector with respect to the X/Y sampling axes, and angle 'B' is the angle that the sampling axis makes with the U/V axes.

If a hue adjustment is simply a rotation by some hue adjustment angle value (call it 'Hue'), then these equations could be re-written to include a hue adjustment as:

$$Uhadj = Vsat * \cos(A+B+Hue)$$

and $$Vhadj = Vsat * \sin(A+B+Hue)$$

Now, this discussion will run through the derivation of the chroma demodulator equations one more time—this time with the Hue adjustment included.

First, recall the trigonometric identities:

```
              sin(A + B) = sin(A)*cos(B) + cos(A)*sin(B)
and
              cos(A + B) = cos(A)*cos(B) - sin(A)*sin(B)
              Next, let C = A + B (to make it easier to keep track of things):
              Uhadj = Vsat * cos(A + B + Hue)
                    = Vsat * cos(C + Hue)
and
              Vhadj = Vsat * sin(A + B + Hue)
                    = Vsat * sin(C + Hue)
and, using the identities:
              Uhadj = Vsat * cos(C + Hue)
                    = Vsat * (cos(C)*cos(Hue) - sin(C)*sin(Hue))
and
              Vhadj = Vsat * sin(C + Hue)
                    = Vsat * (sin(C)*cos(Hue) + cos(C)*sin(Hue))
              Now, replace C with A + B:
              Uhadj = Vsat * (cos(C)*cos(Hue) - sin(C)*sin(Hue))
                    = Vsat * (cos(A + B)*cos(Hue) - sin(A + B)*sin(Hue))
and
              Vhadj = Vsat * (sin(C)*cos(Hue) + cos(C)*sin(Hue))
                    = Vsat * (sin(A + B)*cos(Hue) + cos(A + B)*sin(Hue))
              and use the same trig identities again:
              Uhadj = Vsat * (cos(A + B)*cos(Hue) - sin(A + B)*sin(Hue))
                    = Vsat * ((cos(A)*cos(B) - sin(A)*sin(B))*cos (Hue) -
                      (sin(A)*cos(B)*sin(Hue) - cos(A)*sin (B)*sin(Hue))
                    = Vsat * (cos(A)*cos(B)*cos(Hue) - sin(A)*sin(B) *cos(Hue) -
                      sin(A)*cos(B)*sin(Hue) - cos(A) *sin(B)*sin(Hue))
                    = Vsat*cos(A)*cos(B)*cos(Hue) - Vsat*sin(A) *sin(B)*cos(Hue) -
                      Vsat*sin(A)*cos(B)*sin(Hue) - Vsat*cos(A)*sin(B)*sin(Hue)
and
              Vhadj = Vsat * (sin(A + B)*cos(Hue) + cos(A + B)*sin(Hue))
                    =    Vsat * ((sin(A)*cos(B) + cos(A)*sin(B))*cos (Hue) +
                         (cos(A)*cos(B)*sin(Hue) - sin(A)*sin (B)*sin(Hue))
```

-continued $$\begin{aligned}
&= \text{Vsat} * (\sin(A)*\cos(B)*\cos(\text{Hue}) + \cos(A)*\sin(B) *\cos(\text{Hue}) + \\
&\quad \cos(A)*\cos(B)*\sin(\text{Hue}) - \sin(A) *\sin(B)*\sin(\text{Hue})) \\
&= \text{Vsat}*\sin(A)*\cos(B)*\cos(\text{Hue}) + \text{Vsat}*\cos(A) *\sin(B)*\cos(\text{Hue}) \\
&\quad + \text{Vsat}*\cos(A)*\cos(B)*\sin(\text{Hue}) - \text{Vsat}*\sin(A)*\sin(B)*\sin(\text{Hue})
\end{aligned}$$

Note on FIGURE 5 that:

$$S0 = \text{Vsat} * \cos(A)$$

and $$S1 = \text{Vsat} * \sin(A)$$

so:

$$\begin{aligned}
\text{Uhadj} &= \text{Vsat}*\cos(A)*\cos(B)*\cos(\text{Hue}) - \text{Vsat}*\sin(A)*\sin(B)*\cos(\text{Hue}) - \\
&\quad \text{Vsat}*\sin(A)*\cos(B)*\sin(\text{Hue}) - \text{Vsat}*\cos(A)*\sin(B)*\sin(\text{Hue}) \\
&= S0*\cos(B)*\cos(\text{Hue}) - S1*\sin(B)*\cos(\text{Hue}) - S1*\cos(B)*\sin(\text{Hue}) \\
&\quad - S0*\sin(B)*\sin(\text{Hue})
\end{aligned}$$

and $$\begin{aligned}
\text{Vhadj} &= \text{Vsat}*\sin(A)*\cos(B)*\cos(\text{Hue}) + \text{Vsat}*\cos(A)*\sin(B)*\cos(\text{Hue}) \\
&\quad + \text{Vsat}*\cos(A)*\cos(B)*\sin(\text{Hue}) - \text{Vsat}*\sin(A)*\sin(B)*\sin(\text{Hue}) \\
&= S1*\cos(B)*\cos(\text{Hue}) + S0*\sin(B)*\cos(\text{Hue}) + S0*\cos(B)*\sin(\text{Hue}) - S1*\sin(B)*\sin(\text{Hue})
\end{aligned}$$

Also recall that:

$$\sin(B) = Cx / \text{Bsat}$$

and $$\cos(B) = Cy / \text{Bsat}$$

substituting:

$$\begin{aligned}
\text{Uhadj} &= S0*\cos(B)*\cos(\text{Hue}) - S1*\sin(B)*\cos(\text{Hue}) - S1*\cos(B)*\sin(\text{Hue}) \\
&\quad - S0*\sin(B)*\sin(\text{Hue}) \\
&= S0*Cy*\cos(\text{Hue})/\text{Bsat} - S1*Cx*\cos(\text{Hue})/\text{Bsat} - \\
&\quad S1*Cy*\sin(\text{Hue})/\text{Bsat} - S0*Cx*\sin(\text{Hue})/\text{Bsat} \\
&= (S0*Cy*\cos(\text{Hue}) - S1*Cx*\cos(\text{Hue}) - S1*Cy*\sin(\text{Hue}) - \\
&\quad S0*Cx*\sin(\text{Hue})) / \text{Bsat}
\end{aligned}$$

and $$\begin{aligned}
\text{Vhadj} &= S1*\cos(B)*\cos(\text{Hue}) + S0*\sin(B)*\cos(\text{Hue}) + \\
&\quad S0*\cos(B)*\sin(\text{Hue}) - S1*\sin(B)*\sin(\text{Hue}) \\
&= S1*Cy*\cos(\text{Hue})/\text{Bsat} + S0*Cx*\cos(\text{Hue})/\text{Bsat} - \\
&\quad S0*Cy*\sin(\text{Hue})/\text{Bsat} - S1*Cx*\sin(\text{Hue})/\text{Bsat} \\
&= (S1*Cy*\cos(\text{Hue}) + S0*Cx*\cos(\text{Hue}) + S0*Cy*\sin(\text{Hue}) - \\
&\quad S1*Cx*\sin(\text{Hue})) / \text{Bsat}
\end{aligned}$$

Like as before, assume that in the gain controlled environment of the present design, that Bsat is a constant of 32.

Also, define a few new variables as follows:

$$\begin{aligned}
\text{Cyc} &= Cy * \cos(\text{Hue}) \\
\text{Cxc} &= Cx * \cos(\text{Hue}) \\
\text{Cys} &= Cy * \sin(\text{Hue}) \\
\text{Cxs} &= Cx * \sin(\text{Hue})
\end{aligned}$$

Now, substituting:

$$\begin{aligned}
\text{Uhadj} &= (S0*Cy*\cos(\text{Hue}) - S1*Cx*\cos(\text{Hue}) - S1*Cy*\sin(\text{Hue}) - \\
&\quad S0*Cx*\sin(\text{Hue})) >> 5 \\
&= (S0*\text{Cyc} - S1*\text{Cxc} - S1*\text{Cys} - S0*\text{Cxs}) >> 5 \\
&= (S0*(\text{Cyc} - \text{Cxs}) - S1*(\text{Cxc} + \text{Cys})) >> 5
\end{aligned}$$

and $$\begin{aligned}
\text{Vhadj} &= (S1*Cy*\cos(\text{Hue}) + S0*Cx*\cos(\text{Hue}) + S0*Cy*\sin(\text{Hue}) - \\
&\quad S1*Cx*\sin(\text{Hue})) >> 5 \\
&= (S1*\text{Cyc} + S0*\text{Cxc} + S0*\text{Cys} - S1*\text{Cxs}) >> 5 \\
&= (S1*(\text{Cyc} - \text{Cxs}) + S0*(\text{Cxc} + \text{Cys})) >> 5
\end{aligned}$$

If a couple of other variables are defined:

$$\begin{aligned}
\text{CycmCxs} &= \text{Cyc} - \text{Cxs} \\
\text{CxcpCys} &= \text{Cxc} + \text{Cys}
\end{aligned}$$

the equations simplify to:

$$\begin{aligned}
\text{Uhadj} &= (S0*(\text{Cyc} - \text{Cxs}) - S1*(\text{Cxc} + \text{Cys})) >> 5 \\
&= (S0*\text{CycmCxs} - - S1*\text{CycpCys}) >> 5
\end{aligned}$$

and $$\begin{aligned}
\text{Vhadj} &= (S1*(\text{Cyc} - \text{Cxs}) + S0*(\text{Cxc} + \text{Cys})) >> 5 \\
&= (S1*\text{CycmCxs} - S0*\text{CycpCys}) >> 5.
\end{aligned}$$

Note that the above equations only require two multiply operations, followed by an add/subtract operation. Of course, the calculation of the CycmCxs and CycpCys variables must also be considered:

$$\begin{aligned}
\text{CycmCxs} &= \text{Cyc} - \text{Cxs} \\
\text{CxcpCys} &= \text{Cxc} + \text{Cys}
\end{aligned}$$

and $$\begin{aligned}
\text{Cyc} &= Cy * \cos(\text{Hue}) \\
\text{Cxc} &= Cx * \cos(\text{Hue}) \\
\text{Cys} &= Cy * \sin(\text{Hue}) \\
\text{Cxs} &= Cx * \sin(\text{Hue})
\end{aligned}$$

-continued so $$\begin{aligned}
\text{CycmCxs} &= Cy*\cos(\text{Hue}) - Cx*\sin(\text{Hue}) \\
\text{CxcpCys} &= Cx*\cos(\text{Hue}) + Cy*\cos(\text{Hue})
\end{aligned}$$

Recall that Cx and Cy are two samples of the colorburst, obtained once per line during the colorburst interval. If, like with the saturation adjustment, the hue adjustment is sampled once per line, then these variables, CycmCxs and CxcpCys, can both be calculated after the colorburst, and before the active part of the line begins. In other words, the hue adjustment is pre-calculated such that it doesn't detract from the decoding of the U and V values of the active video.

Moreover, the multiply operations required to generate these hue variables can (and do) use the same multiplier (FIG. 1, 108) and adder/subtractor (FIG. 1, 112) in the demodulator 150—no extra hardware is required.

With 'Hue' as an adjustment, sin(Hue) and cos(Hue) are calculated in the preferred embodiment using combinational logic in a lookup fashion (FIG. 1, 101, 102, 103)

Combining Saturation and Hue

Of course, in the preferred embodiment, both the saturation and hue adjustments need to be combined in order to accommodate both. It was shown earlier that the saturation adjustment is easily implementable by simply multiplying the adjustment by the Cx and Cy colorburst samples:

$$SCx=Sat*Cx$$

$$SCy=Sat*Cy$$

This adjustment can be folded into the calculation of the CycmCxs and CxcpCys variables such that:

$$SCycmCxs=Sat*Cy* \cos(Hue)-Sat*Cx* \sin(Hue)$$

$$SCxcpCys=Sat*Cx* \cos(Hue)+Sat*Cy* \cos(Hue)$$

So finally, the calculation of U and V, with Saturation and Hue adjustments included, can be expressed at any time Tn during the active part of the line as:

$$Un=(S(n)*SCycmCxs-S(n+1)*SCxcpCys)>>5$$

$$Vn=(S(n+1)*SCycmCxs+S(n)*SCxcpCys)>>5$$

where SCycmCxs and SCxcpCys are pre-calculated after obtaining two samples of the colorburst as:

$$SCycmCxs=Sat*Cy* \cos(Hue)-Sat*Cx* \sin(Hue)$$

$$SCxcpCys=Sat*Cx* \cos(Hue)+Sat*Cy* \cos(Hue).$$

One of the differences between the NTSC and PAL standards is the location of the subcarrier reference with respect to the colorburst. In NTSC, the reference is always defined as being 180 degrees from the colorburst, whereas in PAL the definition of the reference changes with respect to the colorburst from line to line. On alternate lines, the reference is either 135 degrees ahead or 135 degrees behind the colorburst.

Implementing this switching really turns out to be quite simple if it is thought of as being a line-to-line dynamic adjustment of the hue. In the preferred embodiment, the PAL implementation is handled by simply adding or subtracting a value of 45 degrees to or from the selected hue adjustment.

Figure 6:
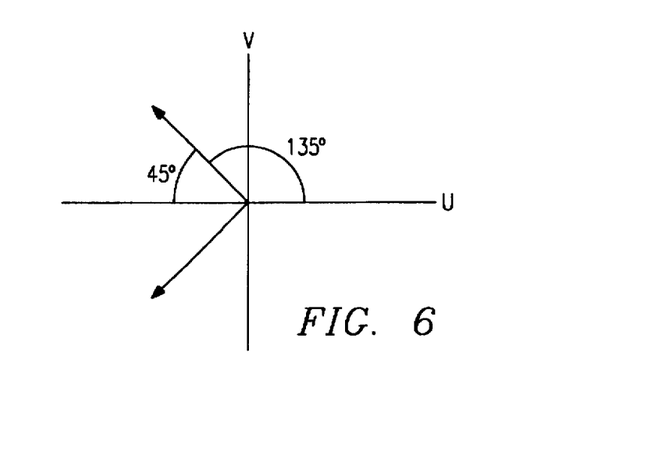
FIG. 6 shows a graph of a NTSC colorburst vector superimposed on switched and unswitched PAL colorburst vectors.

FIG. 6 shows the NTSC colorburst vector superimposed on the same graph as the unswitched and switched PAL colorburst vectors. In all cases, the vectors are drawn such that the subcarrier reference points along the +U axis. From FIG. 6, it can be seen that the demodulator design can be adapted from the NTSC to the PAL standard by adjusting the hue by plus or minus 45 degrees, the difference between the NTSC and PAL colorburst phases. Of course, unlike with NTSC, the demodulator in PAL mode must be cognizant as to whether the line being received has the normal or switched colorburst.

The other differences between decoding NTSC and PAL chroma signals is that on switched lines, the PAL standard inverts the polarity of the V color component. This is handled in the demodulator by alternating the V calculation between:

$$Vn=(S(n+1)*SCycmCxs+S(n)*SCxcpCys)>>5$$

and $$Vn=(-S(n+1)(*SCycmCxs-S(n)*SCxcpCys)>>5$$

depending on whether an unswitched or switched line is being decoded.

Video Decoder Description

Now this discussion returns to the video processor of FIG. 1. The heart of the Video Processor according to the present invention is the Video Decoder, which performs the functions of Luma/Chroma separation and Chroma demodulation. The input to the decoder is a steady stream of sampled baseband video, and the output is decoded YUV video.

With an active line, the decoder has two distinct phases of operation. In the first phase, the function of the decoder is to set up the circuit in preparation for decoding a line of video. This is done by collecting phase information about the line by sampling the colorburst during the colorburst interval. During this phase of operation, the user adjustments of Hue and Saturation are taken into account for preparation for decoding the line. Also during this phase, the blank level of the signal is identified, which will be used in separating the luma from the chroma components during the active part of the line.

The second phase of operation takes place during the entire active part of the line, where the incoming video is processed so as to extract the luma (Y) component from the incoming video, and then to further separate the chroma component into its U and V parts.

In FIG. 1, the bottom half 152 of the drawing represents the logic that calculates the video blank level during the first phase, and extracts the luma from the video during the second phase. The top half 150 of the diagram represents the logic that performs the Hue and Saturation precalculations during the first phase, and separates the U and V from the chroma component during the second phase. The differences between the NTSC and PAL standards are also compensated for in this logic.

Phase 1 Operations

On each active line, a signal called CBGATE from the colorburst gate generator 'starts' the decoder for that line. CBGATE is used by the decoder control logic to start a sequencer that will steer the decoder logic through all of the operations of Phase 1. CBGATE is a one-clock wide pulse that occurs sometime during the colorburst interval.

The Phase 1 operations can in turn be broken down into two functions. In the first function, the logic 152 of the bottom half of FIG. 1 is used to calculate and store the black value of the incoming video. In the second function, the logic of the top half 150 of FIG. 1 is used to precalculate the hue and saturation adjusted axes rotation factors that will be used in decoding the active part of the line.

Black Level Calculation

In order for the decoder to properly extract the luma component from the incoming video, it is necessary to first determine the black level of the incoming signal.

If the active part of a line can be expressed as:

Active_Video=Luma+Chroma then the complete video signal can be expressed as:

Complete_Video=Active_Video+Black meaning that the active part of the signal 'rides' on the black level. In order for the luma to be extracted from the active video, the bottom part of the signal must first be subtracted out. This value that is subtracted is the black level.

Calculating the black level is straightforward in the preferred embodiment, and is based on the knowledge that the incoming video is sampled at exactly four times the color subcarrier, which is exactly the same frequency as the colorburst. When the CBGATE signal is generated during the colorburst interval, the decoder immediately saves four consecutive samples of the colorburst. Given that these four samples are spaced by 90 degrees, four samples represent an entire cycle. The average of these four samples therefore represents the average value of the colorburst, which 'rides' on the blank level.

Once the blank level is calculated, the black level can be calculated (in the PAL standard, they're the same thing). The black level is calculated by adding a constant (10 for NTSC, 0 for PAL) to the blank level. This calculated black level is then stored, and this stored value is subtracted from each active sample during the active portion of the line.

Axes Rotation Factor Calculation

The second function performed during this Phase 1 interval uses the logic in the top half 150 of the block diagram. This function is to perform the necessary precalculations for doing the quadrature demodulation of the chroma component.

Figure 7:
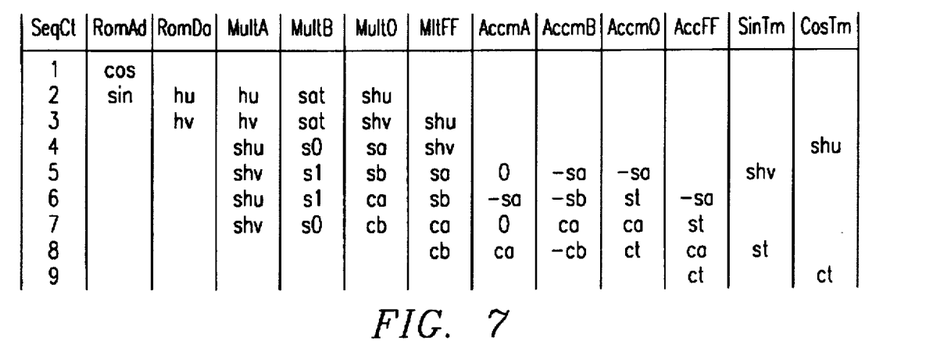
FIG. 7 shows the sequence of operations that is initiated by the CBGATE signal generated during the colorburst interval.

The FIG. 7 shows the sequence of operations that is initiated by the CBGATE signal generated during the colorburst interval.

The left-hand column, 'SeqCt', represents the sequencer in the decoder control logic that begins to count when the CBGATE is received by the decoder. The remaining columns represent various key signals by the decoder block diagram. The abbreviations used for the various signals are shown below.

RomAd=ROM input control/data
RomDa=ROM output data
MultA=multiplier A input
MultB=multiplier B input
MultO=multiplier combination output
MltFF=registered multiplier output
AccmA=adder A output
AccmB=adder B input (output of controlled complementer)
AccmO=adder combination output
AccFF=registered adder output
SinTm=demodulator sin term
CosTm=demodulator cos term The abbreviation used to represent the results of the calculations are listed below:

sin/cos=control to sin ROM
hu=cos(hue register)
hv=sin(hue register)
sat=saturation register
shu=(sat * hu)>>8
shv=(sat * hv)>>8
s0=sampled outburst at time n
s1=sampled outburst at time n+1
sa=s0 * schu
sb=s1 * schv
ca=s1 * schu
cb=s0 * schv
st=−sa * −sb
ct=ca * −cb The end goal and result of all of the above is to generate two numbers that are stored in the registers SinTm and CosTm, that represent the Hue and Saturation-adjusted axis rotation factors to accommodate the difference between the sampling axes and the U/V axes.

Phase 2 Operations

Once the hue and saturation axes correction factors have been calculated and stored, the sequencer within the control logic of the decoder reverts to a state of continuously cycling through the steps to decode the active part of the line.

The logic at the top 150 and bottom 152 half of FIG. 1 each have a function during the active part of the line. On the bottom 152, the logic that was used during the colorburst interval to calculate the black value is now used to extract the luma value from the incoming video. It is also used to separate the luma and chroma components of the incoming video. On the top 150, the logic that was used during colorburst to calculate the hue and saturation axes rotation factors is now used to demodulate the chroma into its U and V components.

Luma Processing

During the active part of the line, processing the luma involves the following operations, which are performed continuously on a sample by sample basis:

Subtract the black level from the incoming video to remove the syncs.

Perform a continuous average, four samples at a time, to extract the luma from this video that has the syncs removed.

Subtract this extracted luma from the signal in order to extract the chroma.

Perform a brightness adjustment on the extracted luma by adding a user selectable Brightness value to it.

Perform a contrast adjustment on the extracted lures by multiplying it by a user selectable Contrast value.

Delay the adjustment luma value to match the inherent latency encountered in demodulating the chroma into its U and V components.

Chroma Processing

Processing the chroma during the active line is a little more involved than the luma processing. Whereas an output luma pixel is generated for each input sample, it requires four samples of the extracted chroma to output a corresponding U and V pixel. Once the initial sequence (started at a corresponding U and V pixel) is complete, the sequencer reverts to a state where it repetitively cycles through four states for the remainder of the line.

Figure 8:
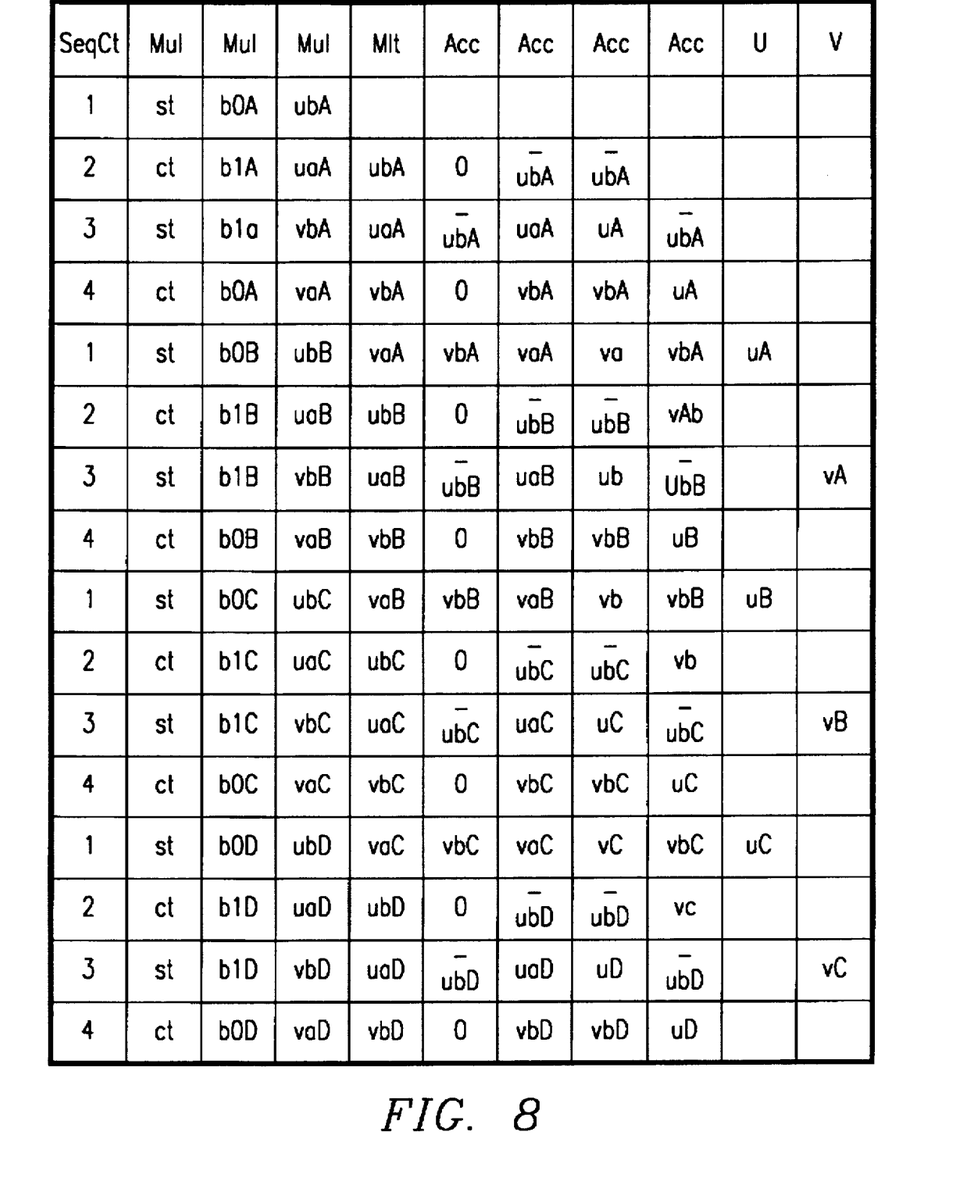
FIG. 8 is a table representing a four-clock sequence and the operations that take place for each clock in the sequence.

FIG. 8 is a table representing this 4-clock sequence and the operations that take place for each clock in the sequence.

The 'A', 'B', and 'C' and 'D' letters in the table refer to four different U and V outputs.

The following values are used in the table:

b0=video sample minus luma at time (n %4)+2
b1=video sample minus luma at time (n %4)+3
ua=ct* b1
ub=st * b0
va=ct * b0
vb=st * b1
u=ua+ub
v=va+vb Note that the function for 'v' is modified slightly when the chip is set to PAL mode, to accommodate the 'PAL switch' of complementing the polarity of the component on alternate lines.

The above-described invention is typically used in a computer system. The computer system includes a central processing unit (CPU), a memory, a monitor, and an input video device such as a tuner or VCR. The above-described invention is associated with graphics/video logic that controls and drives the monitor. Of course, the invention works equally well decoding the video signal from a tuner in a standard television.

As stated above, the present invention can be used to decode any quadrature modulated amplitude signal having a reference burst. Such a decoder would work as described above, except that the color burst and black, color, and brightness components would instead refer to other information.

Although the present invention and its advantages have been described in detail, it should be understood that various changes, substitutions and alterations can be made herein without departing from the spirit and scope of the invention as defined by the appended claims.

We claim:

1. A method of decoding a phase and amplitude modulated signal having a reference burst, comprising the steps of:

during a first decoding phase:
calculating a plurality of constants by sampling the signal; and
determining a black level of the signal;
during a second decoding phase:
decoding color components from the signal by using the plurality of constants; and
extracting a brightness component from the signal by using the black level.

2. The method of claim 1, wherein the plurality of constants comprise:
a hue axis rotation factor; and
a saturation axis rotation factor.

3. The method of claim 1, wherein the calculating step further comprises the steps of:
sampling the reference burst of a line to produce samples;
collecting phase information about the line from the samples; and
calculating the plurality of constants from the phase information.

4. The method of claim 3, wherein the sampling step further comprises the step of:
sampling the reference burst signal at a multiple of four times a frequency of a subcarrier.

5. The method of claim 1, wherein the plurality of constants comprise:

a hue adjustment value; and
a saturation adjustment value.

6. The method of claim 1, wherein the determining step further comprises the steps of:
sampling the reference burst to produce samples;
calculating a blank level from the samples; and
calculating the black level from the blank level.

7. The method of claim 6, wherein the sampling step further comprises the step of:
sampling the reference burst at a multiple of four times a frequency of a subcarrier.

8. The method of claim 6, wherein the calculating a black level step comprises the step of:
adding a black constant to the blank level.

9. The method of claim 8, wherein the black constant is ten.

10. The method of claim 8, wherein the black constant is zero.

11. The method of claim 1, wherein the decoding step comprises the step of:
demodulating a chroma value into a U component and a V component.

12. The method of claim 1, wherein the extracting step comprises the steps of:
subtracting the black level from the signal to produce a modified signal; and
extracting a luma component from the modified signal.

13. The method of claim 12, further comprising the step of:
adding a brightness value to the luma component.

14. The method of claim 12, further comprising the step of:
multiplying the luma component; by a contrast value.

15. A video signal decoder, comprising:
means for calculating a plurality of constants by sampling a video signal during a first decoding phase;
means for determining a black level of the video signal during the first decoding phase;
means for decoding color components from the video signal by using the plurality of constants during a second decoding phase; and
means for extracting a brightness component from the video signal by using the black level during the second decoding phase.

16. The video decoder of claim 15, wherein the plurality of constants comprise:
a hue axis rotation factor; and
a saturation axis rotation factor.

17. The video decoder of claim 15, wherein the calculating means comprises:
means for sampling a colorburst signal of a line to produce samples;
means for collecting phase information about the line from the samples; and
means for calculating the plurality of constants from the phase information.

18. The video decoder of claim 17, wherein the sampling means comprises:
means for sampling the colorburst signal at a multiple of four times a frequency of a color subcarrier.

19. The video decoder of claim 15, wherein the plurality of constants comprises:
a hue adjustment value; and a saturation adjustment value.

20. The video decoder of claim 15, wherein the determining means comprises:

means for sampling a colorburst signal to produce samples;

means for calculating a blank level from the samples; and means for calculating a black level from the blank level.

21. The video decoder of claim 17, wherein the sampling means comprises:

means for sampling the colorburst signal at four times a frequency of a color subcarrier.

22. The video decoder of claim 20, wherein the means for calculating a black level comprises:

means for adding a black constant to the blank level.

23. The video decoder of claim 22, wherein the black constant is ten.

24. The video decoder of claim 22, wherein the black constant is zero.

25. The video decoder of claim 15, wherein the decoding means comprises:

means for demodulating a chroma value into a U component and a V component.

26. The video decoder of claim 15, wherein the extracting means comprises:

means for subtracting the black level from the video signal to produce a modified video signal; and means for extracting a luma component from the modified video signal.

27. The video decoder of claim 26, further comprising:

means for adding a brightness value to the luma component.

28. The video decoder of claim 26, further comprising:

means for multiplying the luma component by a contrast value.

29. A method of decoding a phase and amplitude modulated signal having a reference burst, comprising the steps of:

during a first decoding phase:

calculating a plurality of constants by sampling the signal; and determining a baseline level of the signal from the reference burst;

during a second decoding phase:

decoding a plurality of values from the signal by using the plurality of constants; and extracting the average signal level pertaining to the plurality of values from the signal by using the baseline level.

30. The method of claim 29, wherein the plurality of constants comprise:

an axis rotation factor of a first one of the plurality of values; and an axis rotation factor of a second one of the plurality of values.

31. The method of claim 29, wherein the calculating step further comprises the steps of:

sampling the reference burst of a line to produce samples;

collecting phase information about the line from the samples; and calculating the plurality of constants from the phase information.

32. The method of claim 31, wherein the sampling step further comprises the step of:

sampling the reference burst signal at a multiple of four times a frequency of a subcarrier.

33. The method of claim 29, wherein the determining step further comprises the steps of:

sampling the reference burst to produce samples;

calculating a blank level from the samples; and calculating the baseline level from the blank level.

34. The method of claim 33, wherein the sampling step further comprises the step of:

sampling the reference burst at a multiple of four times a frequency of a subcarrier.

35. The method of claim 29, wherein the baseline level is a black level and wherein the plurality of values are color components of the signal and wherein the average signal level is the brightness component of the signal.

36. The method of claim 30, wherein the first value axis rotation factor is a hue axis rotation and wherein the second value axis rotation factor is a saturation axis rotation.

37. The method of claim 33, wherein the calculating a baseline level step comprises the step of:

adding a black constant to the blank level.

38. The method of claim 37, wherein the black constant is ten.

39. The method of claim 37, wherein the black constant is zero.

* * * * *